United States Patent [19]

Bavelloni

[11] Patent Number: 4,478,007
[45] Date of Patent: Oct. 23, 1984

[54] TOOL POSITIONING DEVICE FOR MACHINING THE EDGES OF SHEET OR PLATE MATERIALS

[75] Inventor: Franco Bavelloni, Appiano Gentila, Italy

[73] Assignee: Z. Bavelloni S.P.A., Bregnano, Italy

[21] Appl. No.: 365,748

[22] Filed: Apr. 5, 1982

[30] Foreign Application Priority Data

Apr. 14, 1981 [IT] Italy ............................... 21486/81[U]

[51] Int. Cl.³ ............................................. B24B 17/00
[52] U.S. Cl. ............................... 51/100 R; 51/105 EC; 51/101 R; 51/33 W
[58] Field of Search ............... 51/34 A, 100 R, 101 R, 51/165.79, 283 E, 105 EC, 33 W

[56] References Cited

U.S. PATENT DOCUMENTS 2,579,337 12/1951 Reaser et al. ..................... 51/283 E
2,722,787 11/1955 Hallewell et al. ................ 51/101 R
2,823,492 2/1958 Arbuckle et al. ................. 51/101 R
2,906,065 9/1959 Reaser .............................. 51/101 R
3,456,395 7/1969 Parrella ............................ 51/49
3,800,621 4/1974 Hoglund .......................... 51/101 R
3,827,189 8/1974 Highberg et al. ................ 51/283 E

FOREIGN PATENT DOCUMENTS 594902 11/1947 United Kingdom ............. 51/100 R

Primary Examiner—Frederick R. Schmidt
Assistant Examiner—Judy J. Hartman
Attorney, Agent, or Firm—Guido Modiano; Albert Josif

[57] ABSTRACT

The device comprises a feeler provided for following the edge profile of the plate or sheet to be machined and having two edge-contacting elements spaced apart from each other and carried on a movable element adapted to control a motor for angularly positioning the tool holder head in accordance with the curvature of the edge to be machined at the location where the tool operates.

3 Claims, 6 Drawing Figures

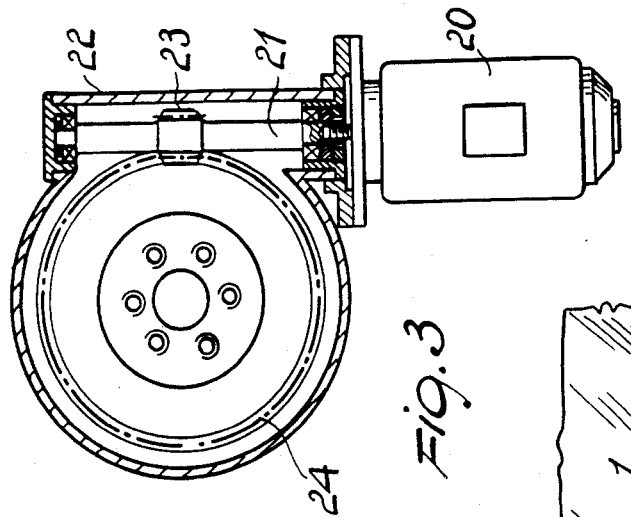
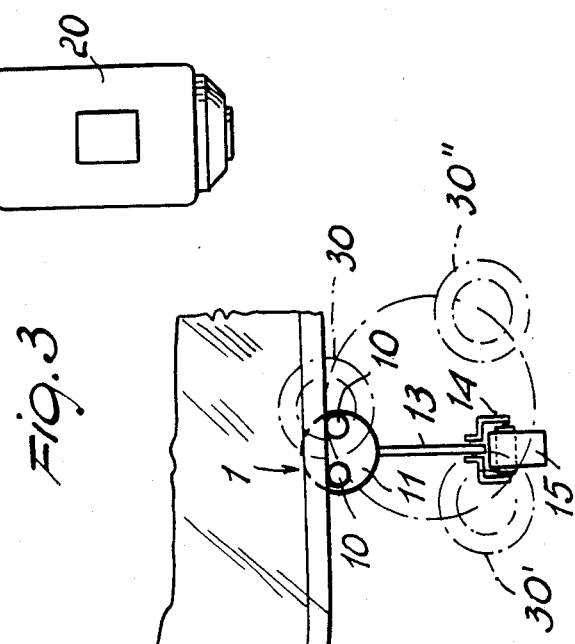
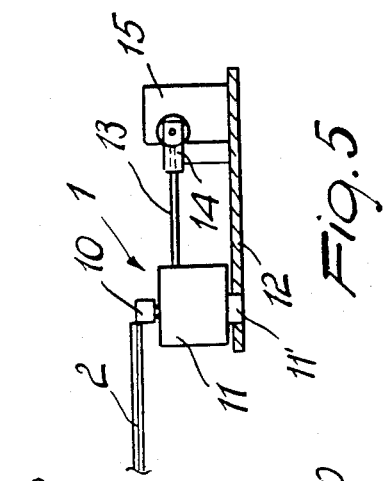
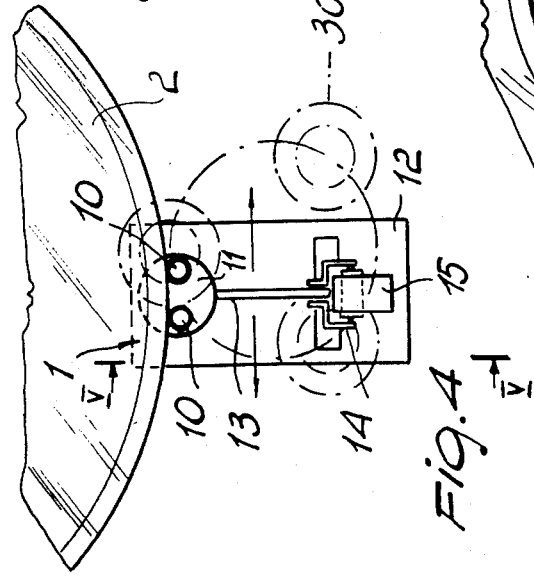
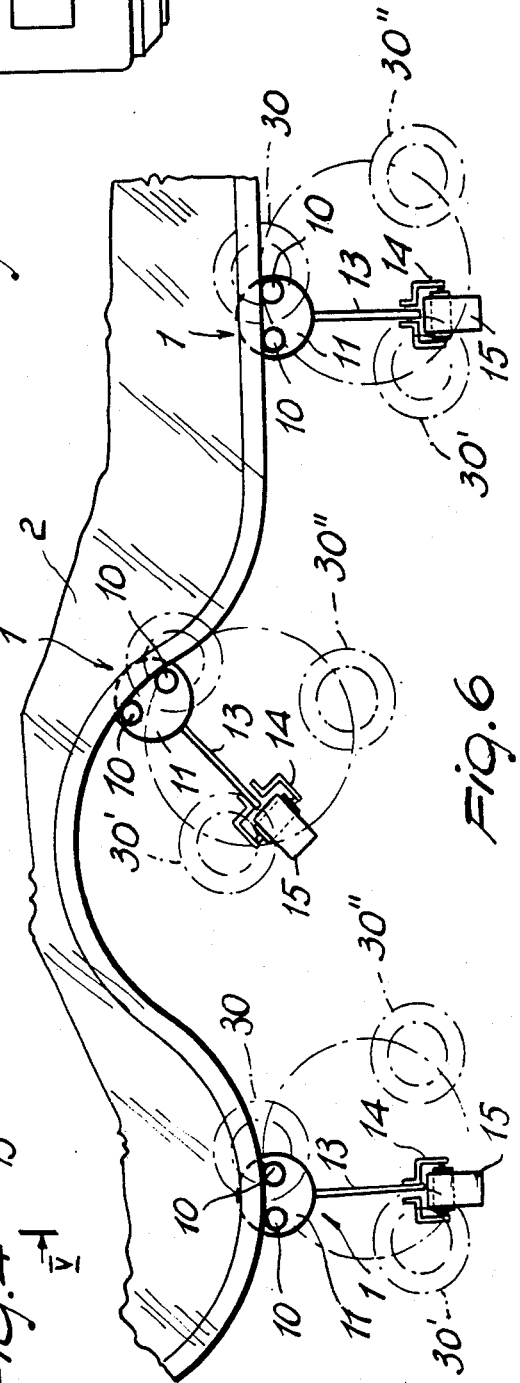

TOOL POSITIONING DEVICE FOR MACHINING THE EDGES OF SHEET OR PLATE MATERIALS

BACKGROUND OF THE INVENTION

This invention relates to a device for angularly positioning a tool head for machining the edges of sheet or plate materials.

As is known, currently available on the market, are automatic machines which can perform, on constant curvature edges of glass sheets, marble slabs, or the like, such operations as chamfering, profile cutting, and the like.

With sheet materials having a varying edge curvature, such as sheet material of oval shape, and edges of various shapes, it is not presently possible to use automatic equipment, since it would be impossible to achieve a proper angular location of the tool in accordance with a particular radius of curvature at the point being machined, and it is current practice to adopt a purely manual procedure the satisfactory issue whereof is entirely dependent on the skill and care applied by the operator.

SUMMARY OF THE INVENTION

A primary object of this invention is indeed that of eliminating prior deficiencies by providing a device for angularly positioning a tool head for machining the edges of sheet or plate materials, which affords the possibility of angular precision positioning, in an automatic manner, the tool even with varying edge curvatures of the material to achieve absolute certainty that the tool is at the appropriate working location.

It is a further object of the invention to provide a device which allows the edge machining steps to be carried out in an automated manner, independently from the operator's own skill.

Another object of this invention is to provide a device of simple construction, which can afford a high level of reliability and safety in operation.

These and other objects, such as will be apparent hereinafter, are achieved by a device for angularly positioning a tool head for machining the edges of sheet or plate materials, according to the invention, characterized in that it comprises a feeler adapted to follow the edge profile of a plate or sheet, and having two edge-contacting elements spaced apart from each other and carried on a movable element adapted to control a motor for positioning the tool holder head in accordance with the curvature of said edge at the working or machining point of said tool.

BRIEF DESCRIPTION OF THE DRAWINGS

Further features and advantages will be more clearly understood from the following detailed description of a tool positioning device, as illustrated by way of example and not of limitation in the accompanying drawings, where:

FIG. 3 is a sectional view in a reduced scale taken along line III—III of FIG. 1, of the drive assembly for positioning the tool holder head;

FIG. 4 shows schematically this device as applied to one edge of a plate;

FIG. 5 is a sectional view taken along the line V—V of FIG. 4; and

FIG. 6 is a diagram illustrating how the tool is positioned in accordance with the varying curvatures of the edge of a plate being machined.

DESCRIPTION OF THE PREFERRED EMBODIMENTS

Figures 1, 2:
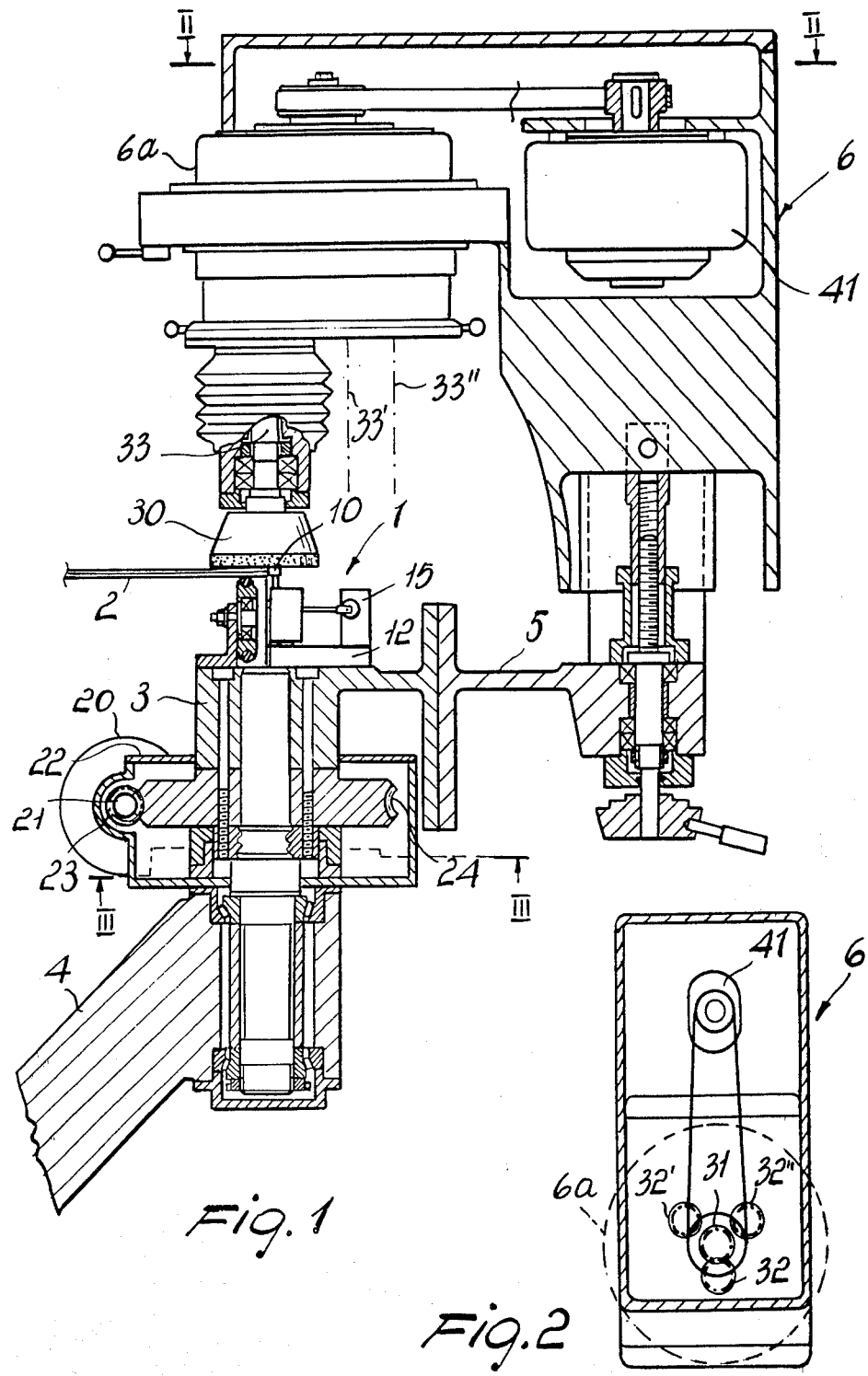
FIG. 1 is a schematic, partly cutaway, view of the inventive device, as incorporated to a tool holder head.
FIG. 2 is a sectional view taken along line II—II of tool actuating means.

With reference to the drawing figures, the device for angularly positioning the tool head for machining the edges of sheet or plate materials, according to the invention, comprises a feeler or tracer unit, generally indicated at 1, which has the function of following the edge of a plate or the like being machined, as indicated at 2.

The cited tracer 1, which will be further described hereinafter, is carried on a supporting body 3, which is rotatably associated with an arm 4 connected to the stationary supporting frame (not shown) of the device.

To said supporting body 3, a bracket 5 is rigidly attached to which is connected a tool holder head, generally indicated at 6. The tool holder head 6 includes a gear box in which gears 31, 32, 32' and 32" are enclosed which will be described later with reference to FIG. 2.

As visible in FIG. 5 the cited tracer 1 includes two edge-contacting elements comprising two tracer points in the form of the small rollers 10 against which the edge of the glass plate 2 is caused to engage. The rollers 10 are supported on a movable element in the form of a body 11 carried for rotation about an axis 11' extending substantially perpendicular to the plate 2 on a small plate 12 which is rigidly secured to the supporting body 3.

The small rollers 10 have the function of contacting the edge of the plate 2 at two locations proximate to and spaced apart from each other, such as to continuously follow what curvature the plate 2 happens to present at the affected area i.e. the geometrical straight line connecting the centers of the two rollers 10 by rotating about the axis 11' always assumes an angular position which is parallel to the secant crossing the two points on the edge of the plate 2, where the two rollers 10 contact the edge of said plate 2. Since the distance between the rollers 10 is relatively small, the said secant is normally parallel to the tangent in an intermediate point of the said plate 2 edge between said two contacting points.

From the body 11, there extends an actuating member in the form of a rod 13 the free end whereof is located between the legs of a fork 14 (FIG. 6) which acts on control means in the form of a transducer 15 which controls driving means in the form of a DC motor 20 for positioning the head 6.

More detailingly, the DC motor 20 (FIG. 3) rotatively drives a small shaft 21 which is carried rotatably in a box-like casing 22 made rigid with the arm 4; to said shaft 21, a gear 23 is keyed which meshes with a helical wheel 24 rigidly connected to the supporting body 3 for rotating the body 3 about an axis which extends substantially perpendicular to the plane containing the plate 2 being machined.

The rotation of the supporting body 3 results in a rotation of the tool holder head and a corresponding rotation of the tool 30 at work, thereby the tool can be angularly positioned in accordance with the curvature of the plate edge at the point of application of the tool.

Advantageously, the tool holder head is provided with three circumferentially spaced apart tools 30, 30', 30" (only one being shown in FIG. 1) which can be singly brought to work to suit individual requirements.

As shown in FIGS. 1 and 2, also provided is a motor 41 for rotating i.e. driving the tool 30 positioned at the plate edge by means of a central gears 31 which meshes selectively with gears 32, 32' or 32" keyed to the respective tools shaft 33 or 33' or 33" located at the corresponding position; by rotating the tool holder assembly, any of the three tools can be engaged as it is shown in dotted lined in FIGS. 4 and 6.

The operation of the device according to this invention will be readily appreciated from the foregoing description. In fact, as a variation in the profile of the plate 2 being machined is met, which variation corresponds to a variation in the curvature of the glass sheet, the contact rollers or elements 10 produce a rotation of the body 11 and consequently of the rod 13, in one direction or the other, depending on the direction of variation of the curvature, i.e. the direction of the secant crossing the two points where the two rollers 10 engage the edge of plate 2.

The rod 13, in its movement, will act, through the fork 14, on the transducer 15, which in turn cause the motor 20 to come into controlled operation whose shaft will rotate in one direction or the other, according to the direction in which the rod 13 has been moved and in view of the controlling action of the transducer 15, per se known.

The motor 20, by virtue of the linkage described hereinabove, rotates the tool holder head and, consequently, brings the tool to work in the appropriate angular position relationship with the edge of the plate being machined.

FIG. 6 schematically illustrates a number of possible curvature variations, for a clearer understanding of the orientations that may be imparted to the tool holder head.

It should be further noted that, in the event of rectilinear edge profiles, there being no curvature variations thereon, no oscillations of the rod 13 will occur, and the rod will not contact the legs of the fork 14, thus leaving the positioning motor inoperative to leave unaltered the trim of the tool at work on the corresponding point on the edge.

The invention as conceived may be variously modified and embodied to suit contingent requirements.

In practicing the invention, the materials employed, and the dimensions and contingent shapes, may be any selected ones for the intended application.

I claim:

1. A device for angularly positioning a tool head for machining the edges of sheet or plate workpiece materials, wherein the machine comprises supporting means for rotatably supporting the tool head about a first axis in use extending transverse to the plane of the workpiece, driving means for controllably imparting angular movements to said tool head and wherein said device comprises a swivelling tracer member having its own axis of rotation in use extending transverse to the plane of said workpiece and about which said swivelling tracer member is adapted to swivel, said tracer member having two spaced apart tracer points movably engaging simultaneously in use the edge of the workpiece to be machined, said tracer points being arranged in fixed position on said tracer member thereby to cause in use angular displacement of said tracer member bodily therewith depending on the curvature profile of the edge of said workpiece against which said tracer points engage, the device further comprising an actuating member responsive to the angular displacement of said tracer member and control means for said driving means to controllably actuate said driving means for imparting controllable angular displacement to said tool head depending on the curvature profile against which said tracer points engage.

2. A device according to claim 1, wherein said tracer points are in the form of rollers, said actuating member is in the form of a rod having a forklike end, said control means are in the form of a transducer arranged with at least one part thereof in the interspace defined by said fork-like end and said driving means are in the form of a D.C. motor controlled through said transducer.

3. A device for angularly positioning a tool head for machining the edges of sheet or plate workpiece materials, wherein the machine comprises supporting means for rotatably supporting the tool head about a first axis in use extending tranverse to the plane of the workpiece, said supporting means including a shaft coaxial with said first axis and a bracket journalled with one end thereof on said shaft and carrying said tool head with the other end thereof offset thereto, said one end having a gear coaxial with said first axis, a D.C. motor having a pinion in mesh with said gear for controllably imparting angular movements to said tool head about said first axis and wherein said device comprises a freely swivelling tracer member having its own axis of rotation in use extending transverse to the plane of said workpiece and about which said swivelling tracer member is adapted to freely swivel, said tracer member having two spaced apart tracer point rollers movably engaging simultaneously in use the edge of the workpiece to be machined, said rollers being arranged in fixed position on said tracer member thereby to cause in use angular swivelling of said tracer member bodily therewith depending on the curvature profile of the edge of said workpiece against which said rollers engage, the device further comprising a rod extending transverse to said first axis and responsive to the angular displacement of said tracer member, said rod having a fork-like free end and a transducer arranged at least in part between the prongs of said fork-like end for controlling said D.C. motor for imparting controllable angular displacement to said tool head depending on the curvature profile against which said two rollers engage.

* * * * *